United States Patent [19]

Masuda

[11] Patent Number: 5,026,177
[45] Date of Patent: Jun. 25, 1991

[54] LUBRICATABLE ROTARY BEARING ASSEMBLY

[75] Inventor: Ichiro Masuda, Hyogo, Japan

[73] Assignee: Nippon Thompson Co., Ltd., Tokyo, Japan

[21] Appl. No.: 378,114

[22] Filed: Jul. 11, 1989

[30] Foreign Application Priority Data

Jul. 12, 1988 [JP] Japan ................................ 63-171913

[51] Int. Cl.⁵ .............................................. F16C 19/30
[52] U.S. Cl. ...................................... 384/447; 384/475; 384/508; 384/619
[58] Field of Search ............... 384/475, 474, 447, 508, 384/619, 906

[56] References Cited

U.S. PATENT DOCUMENTS

| | | | |
|---|---|---|---|
| 1,174,541 | 3/1916 | Bernheim | 384/508 |
| 3,275,391 | 9/1966 | Blais | 384/447 |
| 3,606,503 | 9/1971 | Asberg et al. | 384/508 |

FOREIGN PATENT DOCUMENTS 58-187499  6/1985  Japan .

Primary Examiner—Lenard A. Footland
Attorney, Agent, or Firm—Skjerven, Morrill, MacPherson, Franklin & Friel

[57] ABSTRACT

A rolling contact type rotary bearing assembly includes a pair of inner and outer rings and a plurality of rolling members interposed therebetween to provide a relative rotation between the inner and outer rings. An insertion hole is provided in at least one of the inner and outer rings such that the plurality of rolling members may be inserted into the annular path defined between the inner and outer rings. A closure member is also provided to close the insertion hole after insertion of the rolling members into the annular path. The closure member is formed with a lubrication hole so that a lubricant may be provided to the annular path to allow a smooth rolling movement of the rolling members. A lubricant supply hole may also be provided in either of the outer and inner rings in communication with the lubrication hole of the closure member so as to allow to supply a lubricant to the annular path from the exterior.

5 Claims, 3 Drawing Sheets

LUBRICATABLE ROTARY BEARING ASSEMBLY

BACKGROUND OF THE INVENTION

1. Field of the Invention

This invention generally relates to a rotary rolling contact bearing assembly, and, in particular, to a lubricatable rotary bearing assembly including a plurality of rolling members interposed between a pair of inner and outer rings.

2. Description of the Prior Art

A rotary crossed roller type rolling contact bearing assembly is disclosed in the Japanese Utility Model Post-examination Publication No. 62-16495, which was published for the purpose of oppositions on Apr. 25, 1987 and assigned to the Assignee of this application and which is hereby incorporated by reference. Such a rotary motion rolling contact bearing assembly generally includes a plurality of rolling members interposed between a pair of inner and outer rings which rotate relative to each other. The rolling contact members may be cylindrical or truncated conical rollers or balls. In the case of rollers, they are provided in a crossed arrangement, i.e., any two adjacent rollers being oriented with their rotating axes extending perpendicular to each other when viewed in the direction of advancement of the rollers.

A rotary rolling contact bearing assembly shown in the above-identified Utility Model Publication includes an insertion hole provided in either of the inner and outer rings, through which rolling members may be inserted into an annular path defined between the inner and outer rings. A closure member is fitted into the insertion hole after insertion of rolling members into the annular path to close the insertion hole to thereby prevent the rolling members from falling off. The rotary contact bearing assembly shown in the above-identified Utility Model Publication is advantageous in many respects, for example compactness, easiness in manufacture and rigidness in structure; however, difficulty is encountered in lubrication of the bearing assembly. That is, it is not easy to provide oil and/or grease particularly to the annular rolling contact path of the bearing assembly. Lubrication may not be a problem in some applications, but lubrication becomes critical in other applications. Therefore, the scope of application of the rotary rolling contact bearing assembly shown in the above-identified Utility Model Publication was rather limited. In particular, such rotary rolling contact bearing assemblies find a usage in robots, e.g., joints of their arms, or they may be required to support a rotating shaft at high speed. In these cases, the rotary bearing assemblies must be lubricated to maintain its high performance. The above-identified Utility Model Publication is totally silent as to the problem of lubrication.

SUMMARY OF THE INVENTION

In accordance with the present invention, there is provided a rolling contact type rotary bearing assembly comprising a pair of inner and outer rings, which define an annular path when axially aligned, and a plurality of rolling members provided in the annular path. An insertion hole is formed in at least one of the pair of inner and outer rings such that the insertion hole extends from a peripheral surface of either of the inner and outer rings to the annular path. Thus, the plurality of rolling members may be inserted into the annular path with the inner and outer rings set in position or axially aligned. Such a structure is particularly advantageous because it allows both the inner and outer rings to be thinner in thickness and/or smaller in size. The rolling members may be cylindrical or truncated cone rollers, balls or the like. When use is made of rollers, they are preferably provided in the so-called crossed arrangement, i.e., any two adjacent rollers being arranged with their rotating axes extending perpendicular to each other when viewed in the direction of advancement thereof.

The present rotary bearing assembly also includes a closure member which may be fitted into the insertion hole to have it closed to thereby prevent the rolling members inserted into the annular path from falling out. The closure member, preferably, has a shaped end surface which defines a part of the annular path when the closure member is set in position. The closure member has a main body having an outer shape complementary to the shape of the insertion hole provided in at least one of the inner and outer rings. For example, the insertion hole may have a circular cross section and the closure member may have a cylindrical main body which snugly fits into the insertion hole. And, the shaped end surface is defined at one end of the main body of the closure member. Preferably, a fixing means is provided to fix the closure member in position after insertion into the insertion hole. A screw, an adhesive or any other appropriate fixing means may be used to fix the closure member to the inner or outer ring depending upon in which one the insertion hole is formed.

Importantly, the present rotary bearing assembly is so structured to have a lubrication function utilizing its closure member. For this purpose, the closure member is formed with a lubrication hole having one end located at or in the vicinity of the shaped end surface thereof, which also defines a part of the annular path of the rotary bearing assembly. In one embodiment, the other end of the lubrication hole is located at the side or peripheral surface of the main body of the closure member. In this case, the inner or outer ring, in which the insertion hole is formed, is also formed with a supply hole which communicates with the lubrication hole of the closure member when the closure member is set in position in the corresponding insertion hole. In another embodiment, the lubrication hole extends straight through the main body, in which case the other end of the lubrication hole is located at the end surface opposite the shaped end surface of the closure member.

Such a structure is particularly advantageous since lubrication is provided to the rotary bearing assembly utilizing the closure member. In other words, it is not necessary to provide an additional hole in either of the inner and outer rings so as to provide a hole leading to the annular path to provide lubrication. The lubrication hole is defined in the closure member at least partly and thus it contributes to reduce the integrity of the bearing assembly even if it is designed to be smaller in size and/or thickness. Besides, since the lubrication hole is defined in the closure member at least partly, difficulty in manufacture is significantly reduced.

It is therefore a primary object of the present invention to obviate the disadvantages of the prior art as described above and to provide an improved rolling contact type rotary bearing assembly.

Another object of the present invention is to provide an improved rotary bearing assembly compact in size, light in weight and yet rigid in structure.

A further object of the present invention is to provide an improved rotary bearing assembly serviceable for an extended period of time and even under heavy duty conditions.

A still further object of the present invention is to provide a compact high-speed rotary bearing assembly easy to manufacture and at low cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
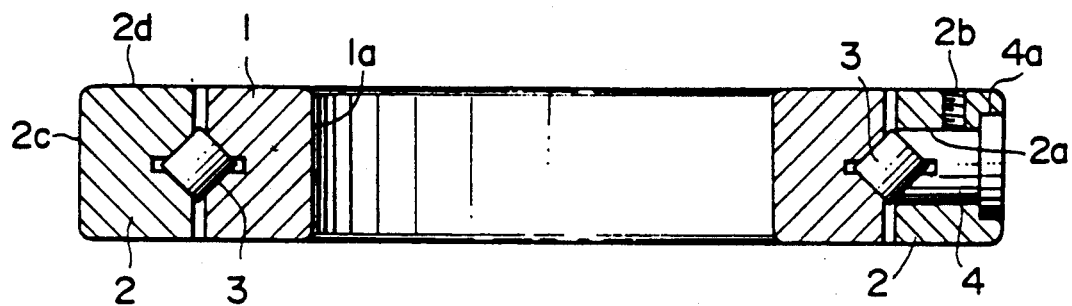
FIG. 1 is a cross sectional view showing a rolling contact rotary bearing assembly constructed in accordance with one embodiment of the present invention.

Referring now to FIG. 1, there is schematically shown a rolling contact type rotary bearing assembly constructed in accordance with one embodiment of the present invention. As shown, the present rolling contact type rotary bearing assembly generally includes a pair of inner and outer rings 1 and 2 and a plurality of rolling members 3 interposed between the inner and outer rings 1 and 2 so as to provide a relative rotation therebetween. The inner ring 1 has an inner peripheral surface and an outer peripheral surface which is provided with an inner guide groove extending in the circumferential direction. The outer ring 2 is so sized to be loosely fitted onto the inner ring 1 and it has an inner peripheral surface provided with an outer guide groove extending in the circumferential direction and located opposite to the inner guide groove of the inner ring 1 when the inner and outer rings 1 and 2 are axially aligned and an outer peripheral surface 2c. In the illustrated embodiment, the outer ring 2 has a side surface 2d which is substantially flush with the side surface of the inner ring 1 when the inner and outer rings 1 and 2 are axially aligned.

As a result, when assembled, the inner and outer guide grooves of the inner and outer rings 1 and 2, respectively, together define an annular path along which the rolling members 3 may roll when the inner and outer rings 1 and 2 rotate relative to each other. In the illustrated embodiment, use is made of cylindrical rollers as the rolling members 3 and these rollers 3 are arranged in the so-called crossed arrangement so that any two adjacent rollers 3 are arranged with their rotating axes directed perpendicular to each other when viewed in the direction of movement of the rollers 3. It should, however, be noted that use may be made of any other type of rolling members, such as truncated conical rollers or spherical balls, if desired. In the illustrated embodiment, since use is made of cylindrical rollers 3, each of the inner and outer guide grooves of the respective inner and outer rings 1 and 2 has a V-shaped cross section and a circumferential recess is formed along the bottom of the guide groove. The provision of such circumferential recess is advantageous in providing a smooth rolling contact between the rollers 3 and the corresponding V-shaped guide groove because the recess serves as a relief for receiving therein the corresponding corner of each of the rollers 3.

As also shown in FIG. 1, the present rotary bearing assembly is provided with an insertion hole 2a in the outer ring 2 as extending radially. In the illustrated embodiment, the insertion hole 2a is circular in cross section; however, it may have any desired cross sectional shape other than circular cross section. However, the insertion hole 2a must have the smallest transverse size, or diameter in the illustrated embodiment, which is larger than the diameter of the cylindrical rollers 3, but smaller than the diagonal size of the cylindrical rollers 3. Thus, the insertion hole 2a allows the cylindrical rollers 3 to be inserted into the annular path defined between the inner and outer rings 1 and 2. It is to be noted that the insertion hole 2a may be provided in the inner ring 1 in addition to or instead of the outer ring 2 as shown in FIG. 1.

The present rotary bearing assembly is also provided with a closure pin 4 which serves as a closure member to close the insertion hole 2a. The closure pin 4 is preferably fixedly attached to the insertion hole 2a by any suitable fixing means, such as screws, pins and adhesives. For example, the closure pin 4 may be formed with a flange 4a at its end, which is used to have the closure pin 4 fixed in position in the insertion hole 2a, for example, by a screw or pin. In the structure shown in FIG. 1, the outer ring 2 is also formed with a lubricant supply hole 2b which extends axially from the side surface 2d of the outer ring 2 to the insertion hole 2a. As will be made clear later, this lubricant supply hole 2b is in communication with a lubricant supply hole or lubrication hole formed in the main body of the closure pin 4. The lubricant supply hole 2b is preferably threaded so that any desired fitting for a lubricant supply hose may be threaded into it if desired. It should be noted that if an insertion hole is formed in the inner ring 1, then a corresponding lubricant supply hole should be formed in the inner ring 1.

Figure 2:
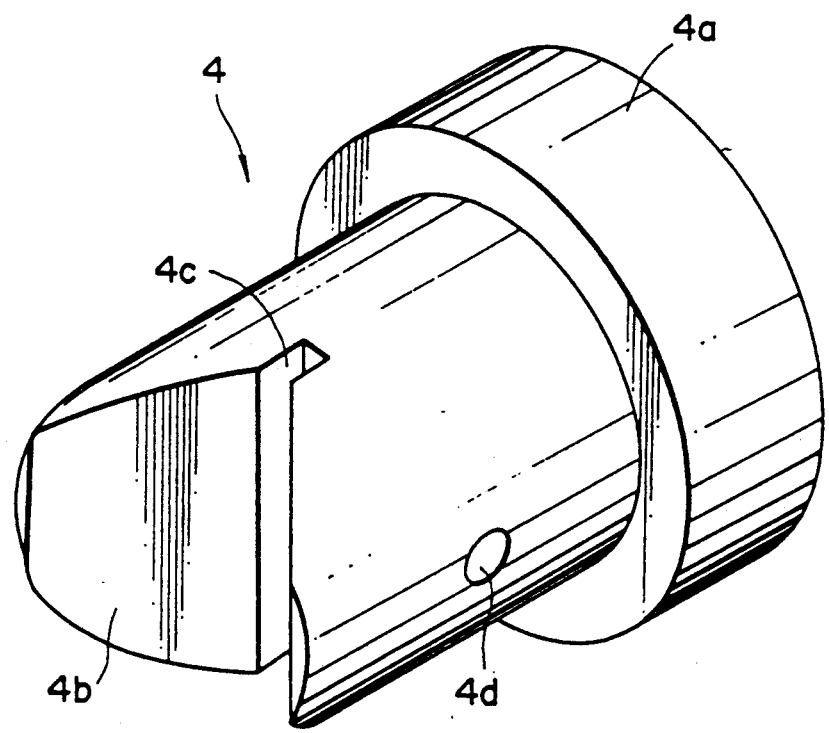
FIG. 2 is a perspective view showing on an enlarged scale the closure member provided to close the insertion hole of the rotary bearing assembly shown in FIG. 1.

FIG. 2 illustrates in perspective view on a somewhat enlarged scale the closure pin 4 fitted into the insertion hold 2a of the outer ring 2 for closure thereof. As shown, the closure pin 4 includes a main body which is generally cylindrical in shape having a shaped end surface 4b at one end and a flange 4a at the other end. The flange 4a has a size which is larger than the size of the insertion hole 2a so that the flange 4a serves as a stopper to keep the closure pin 4 located in the intended location inside the insertion hole 2a. The shaped end surface 4b of the closure pin 4 is cut-away in the shape of "V" with a relief recess 4c provided at the bottom of the V-shaped cut-away section. It should thus be understood that the V-shaped end surface 4b defines a part of the outer guide groove of the outer ring 2 or annular path of the assembly when the closure pin 4 is fixedly set in position inside the insertion hole 2a. And, the relief recess 4s is also circumferentially aligned with the recess of the outer ring 2. Thus, when the closure pin 4 is set in position, there is defined a smooth annular path between the inner and outer rings 1 and 2 so that the cylindrical rollers 3 do not experience any irregularity in their rolling motion. Preferably, the closure pin 4 may be so sized that the V-shaped end surface 4b is located slightly retracted from the V-shaped surface of the corresponding guide groove of the outer ring 2. Such a structure is advantageous in preventing the V-shaped end surface 4b of the closure pin 4 from projecting into the annular path to thereby form a bump against the rollers 3.

The closure pin 4 also includes a lubrication hole or lubricant supply hole formed in its main body. In FIG. 2, one end 4d of such a lubricant supply hole is shown and it has other end in fluidic communication with the relief recess 4c or V-shaped end surface 4b so as to insure that the lubricant is constantly supplied to the V-shaped end surface 4b.

Figure 3:
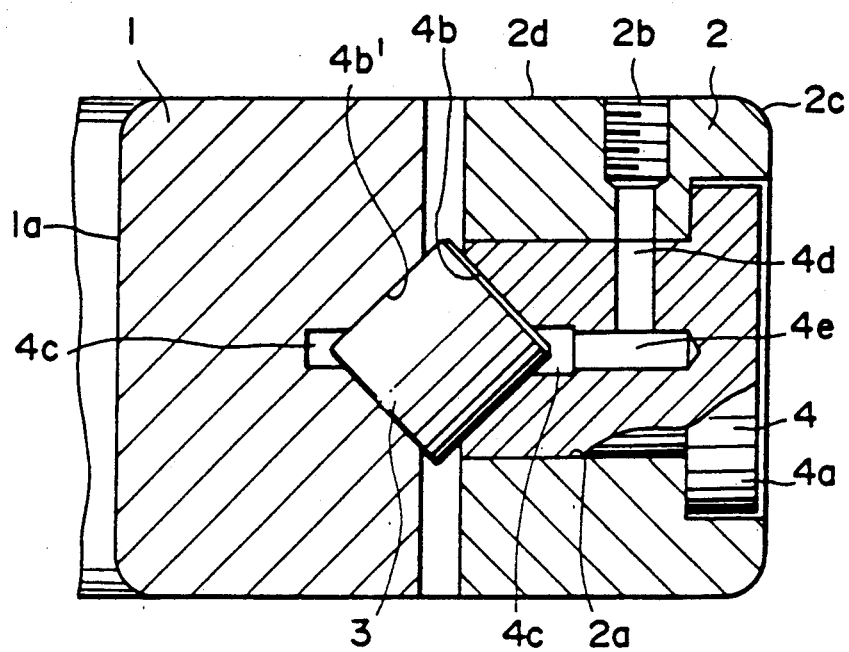
FIG. 3 is a partial, sectional view showing on an enlarged scale a part of the structure shown in FIG. 1.

Referring now to FIG. 3, which shows a part of the structure shown in FIG. 1 on a somewhat enlarged scale, the closure pin 4 is formed with an axial hole 4e which extends axially in the main body of the closure pin 4 and which is in communication with the relief recess 4c and also with a radial hole 4d which extends radially from the axial hole 4e to the outer peripheral surface of the main body of the closure pin 4. As shown in FIG. 3, the radial hole 4d is in fluidic communication with the lubricant supply hole 2b of the outer ring 2. Thus, it is clear that lubricant may be supplied to the annular path of the rollers 3 from the exterior through the lubricant supply line which partly extends through the closure pin 4. In the structure shown in FIG. 3, the flange 4a of the closure pin 4 is so shaped that its outer end surface is located slightly inwardly of the outer peripheral surface 2c of the outer ring 2. Such an arrangement is advantageous because it assists in locating the V-shaped end surface 4b of the closure pin 4 slightly outward from the outer guide groove of the outer ring 2 when in use. This is because the outer ring 2 is typically fitted into a circular mounting section when it is mounted on a desired object and the closure pin 4 is allowed to shift its position slightly outward because of the clearance between the flange 4a and the circular mounting surface, so that such an arrangement prevents the V-shaped end surface 4b of the closure pin 4 from sticking out into the annular path for the rollers 3.

It should also be noted that the insertion hole 2a of the structure shown in FIG. 3 has a stepped portion at its outer end to provide a widened section which is larger in diameter than the rest of the insertion hole 2a. With this structure, the flange 4a of the closure pin 4 may rest on the stepped portion to be located inside of the widened section of the insertion hole 2a. Thus, any part of the closure member 4 is prevented from projecting outside of the insertion hole 2a. Such a structure is practically quite advantageous because no restrictions are imposed in mounting the present bearing assembly.

Figure 4:
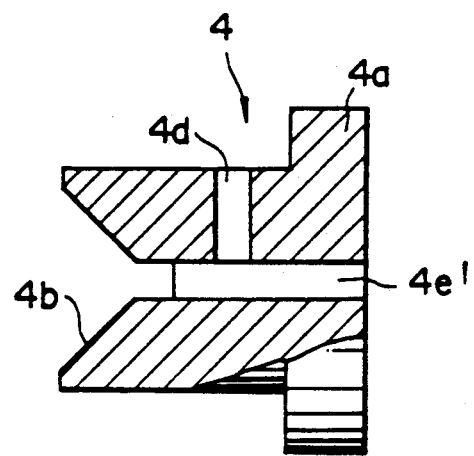
FIG. 4 is a partially sectional view showing a closure member constructed in accordance with another embodiment of the present invention, which may be used in the structure shown in FIG. 1.

FIG. 4 illustrates another embodiment of the closure pin 4 which is similar in many respects to the closure pin 4 shown in FIGS. 2 and 3 excepting the fact that it has an axial hole 4e' which extends completely through the main body of the closure pin 4. With this closure pin 4, lubricant may be supplied from the outer peripheral surface of the outer ring 2. As a further modification, the radial hole 4d may be omitted if desired in the structure shown in FIG. 4.

Figure 5:
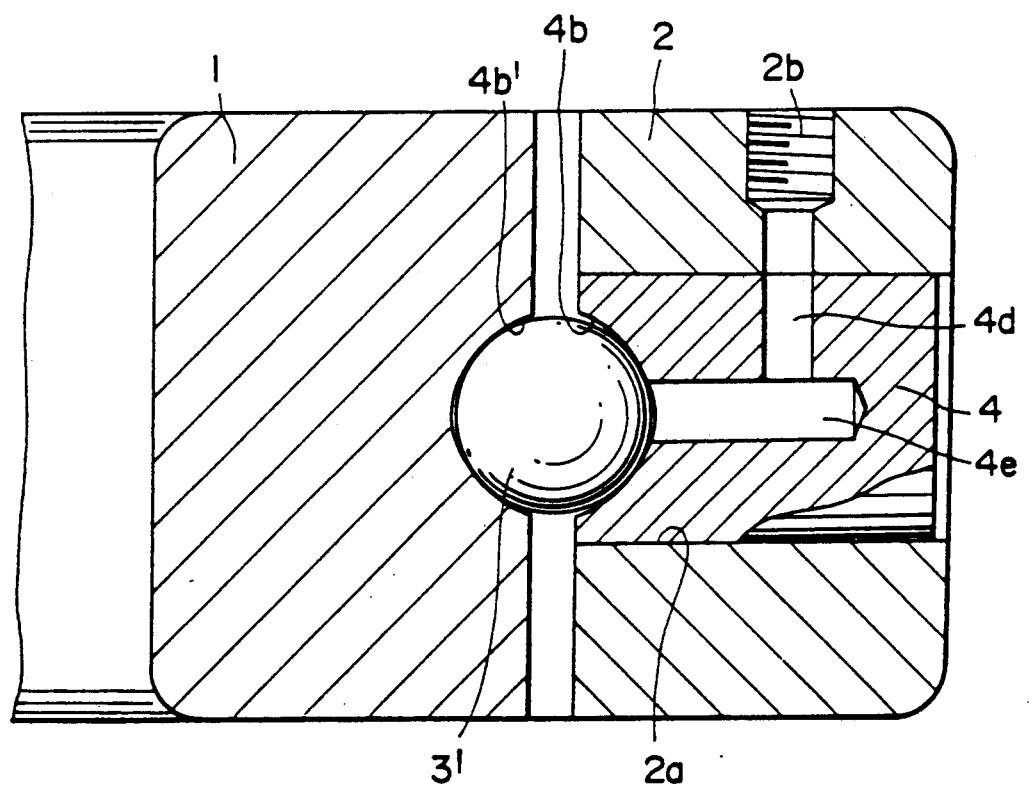
FIG. 5 is a partial, sectional view showing a part of a rolling contact type rotary bearing assembly constructed in accordance with a further embodiment of the present invention.

FIG. 5 illustrates a rolling contact type rotary bearing assembly constructed in accordance with another embodiment of the present invention using a plurality of spherical balls 3' as the rolling members. The present embodiment is substantially similar in structure to the embodiment shown in FIG. 3 excepting the fact that use is made of spherical balls 3' as the rolling member and thus the guide grooves are U-shaped rather than V-shaped It should also be noted that in the embodiment shown in FIG. 5, use is made of a closure pin 4 having no flange portion. That is, the closure pin 4 in the present embodiment is cylindrical in shape and it is completely fitted into the insertion hole 2a of the outer ring 2. The axial length of the closure pin 4 is set to be slightly shorter than the length of the insertion hole 2a for the same reason as stated above in connection with the previous embodiments. Although not shown specifically in FIG. 5, it should be noted that the closure pin 4 is fixedly attached to the insertion hole 2a by any desired fixing means, such as a set screw.

While the above provides a full and complete disclosure of the preferred embodiments of the present invention, various modification, alternate constructions and equivalents may be employed without departing from the true spirit and scope of the invention. For example, although not described specifically, any sealing means may be provided for sealing the lubricant in the bearing assembly, if desired. Besides, in the embodiments described above, the lubrication hole formed in the closure pin 4 has both axial and radial sections; however, the lubrication hole may be formed in any desired manner in the closure pin 4 and it should not be limited to such a two-part structure. For example, a single slant lubrication hole extending between the lubricant supply hole 2b of the outer ring 2 and the relief recess 4c or end surface 4b may be provided, if desired. Such a single slant hole may be easily formed particularly when the closure pin 4 is to be fabricated by sintering rather than cutting. Accordingly, it should be noted that in accordance with the present invention, lubrication can be provided to secure the high bearing performance for an extended period of time without causing any reduction in rigidity of the bearing assembly. Since lubrication can be applied directly to the annular path of the rolling members, the effects of lubrication are enhanced and the rolling resistance of the rolling members is minimized. Therefore, the above description and illustration should not be construed as limiting the scope of the invention, which is defined by the appended claims

What is claimed is:

1. A rotary bearing assembly, comprising:
   a first ring having a first grooved bearing surface;
   a second ring having a second grooved bearing surface disposed opposite said first ring such that said grooved surfaces form an annular path for rolling members, one of said rings means for forming a peripheral aperture for reception of a plurality of rolling members;
   a closure member insertible into said peripheral aperture said member including an axial hole extending inwardly from a distal end of said member and a radial hole extending from an exterior surface of said member intersecting said axial hole; and
   a lubricant supply hole extending through said one ring and oriented with a longitudinal axis of said member radial hole for supplying lubricant from the exterior of said one ring to a groove bearing surface of said one ring through said supply hole, said radial hole, and said axial hole.

2. The assembly of claim 1, wherein said closure member includes a flange which sits on a widened section of said insertion hole to thereby serve to locate said closure member in position inside said insertion hole.

3. The assembly of claim 1, wherein said plurality of rolling members are generally cylindrical in shape.

4. The assembly of claim 3, wherein said plurality of generally cylindrical rolling members are arranged such that any two adjacent ones are arranged with their rotating axes extending perpendicular to each other when viewed in the direction of movement of said rolling members along said annular path.

5. The assembly of claim 1, wherein said plurality of rolling members are generally spherical in shape.

* * * * *